(12) United States Patent
Lee et al.

(10) Patent No.: US 6,810,701 B2
(45) Date of Patent: Nov. 2, 2004

(54) LOCK ASSEMBLY HAVING A SHORT KEY RECESS

(75) Inventors: Jae Gui Lee, Pusan-Si (KR); Byung Mun Lim, Gyungki-Do (KR)

(73) Assignees: Hyundai Motor Company, Seoul (KR); Shinchang Electronics Co., Ansan-Si (KR)

( * ) Notice: Subject to any disclaimer, the term of this patent is extended or adjusted under 35 U.S.C. 154(b) by 0 days.

(21) Appl. No.: 10/328,375

(22) Filed: Dec. 20, 2002

(65) Prior Publication Data

US 2003/0217572 A1 Nov. 27, 2003

(30) Foreign Application Priority Data

May 27, 2002 (KR) ................................ 10-2002-0029233

(51) Int. Cl.[7] .............................................. B60R 25/02
(52) U.S. Cl. ........................................... 70/186; 70/252
(58) Field of Search ........................... 70/184–186, 252

(56) References Cited

U.S. PATENT DOCUMENTS

| | | | | |
|---|---|---|---|---|
| 3,748,877 A | * | 7/1973 | Wolter ......................... | 70/186 |
| 3,782,145 A | * | 1/1974 | Wolter ......................... | 70/186 |
| 4,333,325 A | * | 6/1982 | Morikawa et al. ............ | 70/186 |
| 4,400,954 A | * | 8/1983 | Nakamoto et al. ............ | 70/186 |
| 4,414,830 A | * | 11/1983 | Maiocco ....................... | 70/252 |
| 4,487,042 A | * | 12/1984 | Mochida et al. .............. | 70/186 |
| 4,972,692 A | * | 11/1990 | Morikawa et al. ............ | 70/186 |
| 5,271,252 A | * | 12/1993 | Yasuhara et al. ............. | 70/186 |
| 5,632,167 A | * | 5/1997 | Kawachi et al. .............. | 70/186 |
| 6,237,378 B1 | * | 5/2001 | Canard ......................... | 70/252 |
| 6,327,882 B1 | * | 12/2001 | Canard ......................... | 70/186 |
| 6,389,856 B1 | * | 5/2002 | Watanuki et al. ............. | 70/186 |
| 2002/0178769 A1 | * | 12/2002 | Okuno ......................... | 70/186 |

* cited by examiner

*Primary Examiner*—Suzanne Dino Barrett
(74) *Attorney, Agent, or Firm*—Morgan Lewis & Bockius LLP

(57) ABSTRACT

A lock assembly having a short key recess for reducing a length of an ignition key for a vehicle includes, a locking lever, a stopper plate and a push rod placed in a steering shaft. Thereby, a modulation of a crush pad and an instrument panel can be easily established. As the structure and an operation mechanism of the lock assembly are improved, there are advantages in that the length of the ignition key can be reduced while it is possible to provide a convenience to a user.

14 Claims, 17 Drawing Sheets

LOCK ASSEMBLY HAVING A SHORT KEY RECESS

FIELD OF THE INVENTION

The present invention relates to a lock assembly for a vehicle, and more particularly to a lock assembly requiring a short key recess that is more convenient to carry.

BACKGROUND OF THE INVENTION

Typically, an ignition key for starting a vehicle includes a grip and a metal key steel portion integrated with the grip portion and having an elongate length. The length of such an ignition key is often inconvenient and uncomfortable for carrying in one's pocket. In addition, different vehicles typically require different lock assemblies. This requires a vehicle manufacturer to produce multiple lock assemblies, which is both costly and inefficient. Accordingly, a lock assembly that has a short key recess and that can be used for multiple vehicles would be highly desirable.

SUMMARY OF THE INVENTION

The present invention has been made to solve the above-mentioned problem, and accordingly it is the object of the present invention to provide a lock assembly having a short key recess for reducing a length of an ignition key for a vehicle, of which a structure and an operation mechanism are improved to make the length of the short key be short so as to provide a convenience to a user, and which is capable of easily establishing a modulation of a crush pad as all elements of the lock assembly can be disposed in a steering shaft while applying the lock assembly to a different type of vehicles.

In order to achieve the object of the present invention, there is provided a lock assembly having a short key recess for reducing a length of an ignition key for a vehicle, which comprises: a rotor having a key recess; a push rod engaged with a rear end of the rotor, of which a side of an intermediate portion and a side of the rear end respectively have slide surfaces which are inclined inside; a stopper plate mounted on a peripheral surface of the push rod; a cam shaft engaged with a rear end of the push rod; a locking stopper moving upwardly and downwardly as the cam shaft is rotated; a lock bar engaged with a lower end of the locking stopper; a pusher mounted in the rotor to be forwardly and backwardly rotated about an axis of a hinge shaft; a knob integrally formed on a front end surface of the push rod which is inserted into the rear end of the rotor; a slide piece which is placed so that an inner surface is in a surface contact with the slide surface of the rear end of the push rod; a locking lever having a short length, which is fixed by a hinge at an intermediate portion thereof to a lock body of the lock assembly; and a spring mounted on an outer surface of the front end of the locking lever to be supported by means of the lock body, wherein an inner surface of the front end of the locking lever comes in a surface contact with the slide piece, and wherein a vertically bent surface of the rear end of the locking lever is positioned at a desired distance from a side surface of an upper body of the locking stopper.

Preferably, the pusher is formed with an inclined surface such that an upper end thereof is combined with the inner surface of the rotor and a lower end thereof comes in a surface contact with the knob of the push rod.

Further preferably, the pusher is mounted on an intermediate portion of an inner portion of the rotor in order to be pushed by means of a much shorter ignition key.

According to the feature of the present invention, the rotor has a space at the intermediate portion of the inner portion thereof, in which the pusher is mounted to be forwardly and reversely rotated.

The lock assembly according to the present invention further comprises a pressed spring which is disposed between the rear end of the push rod and the cam shaft in which the rear end of the push rod is inserted.

Further, according to the invention there is provided a lock assembly. The lock assembly includes a lock body, a rotor, a push rod, a pusher, a slide piece, a locking lever, and a spring. The rotor has a reduced length key recess. The push rod has an inclined slide surface near a rear end thereof. The pusher is mounted between the rotor and the push rod and is configured to be rotated forward and backward about an axis. The slide piece is configured to engage the slide surface. The locking lever is rotatably coupled to the lock body by a hinge near an intermediate portion thereof. The front end of the locking lever is configured to contact the slide piece. The spring is coupled between the front end of the locking lever and the lock body to bias the front end of the locking lever against the slide piece.

This lock assembly preferably further includes a cam shaft configured to engage with the rear end of the push rod, and a locking stopper configured to move upward and downward as the cam shaft is rotated. A rear end of the locking lever is positioned at a desired distance from a side surface of an upper body of the locking stopper. A lock bar preferably engages with a lower end of the locking stopper. Also, a knob is preferably integrally formed with a front end of the push rod, where the know is configured to engage the pusher.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Figure 14:
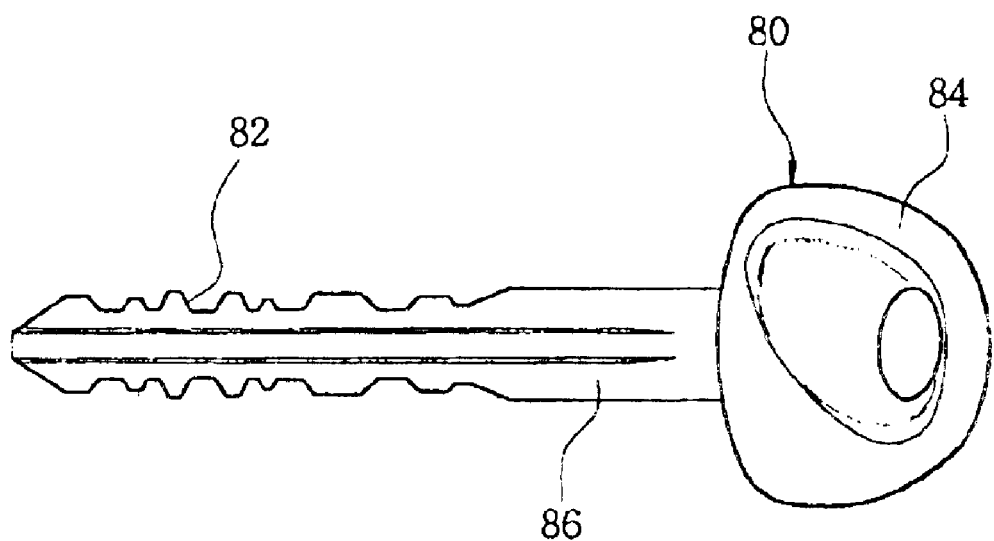
FIG. 14 is a perspective view of a typical ignition key for a vehicle, according to the prior art.

Typically, an ignition key for starting a vehicle includes a holder portion 84 made of synthetic resin on which a logo of maker is engraved, and a metal key portion 86 integrated with the holder portion 84 and having a desired length, especially in which a cut portion 82 is formed, as shown in FIG. 14. Generally, the metal key steel portion 86 of the ignition key has an elongate and relatively long length, which may be inconvenient to carry.

Figure 8:
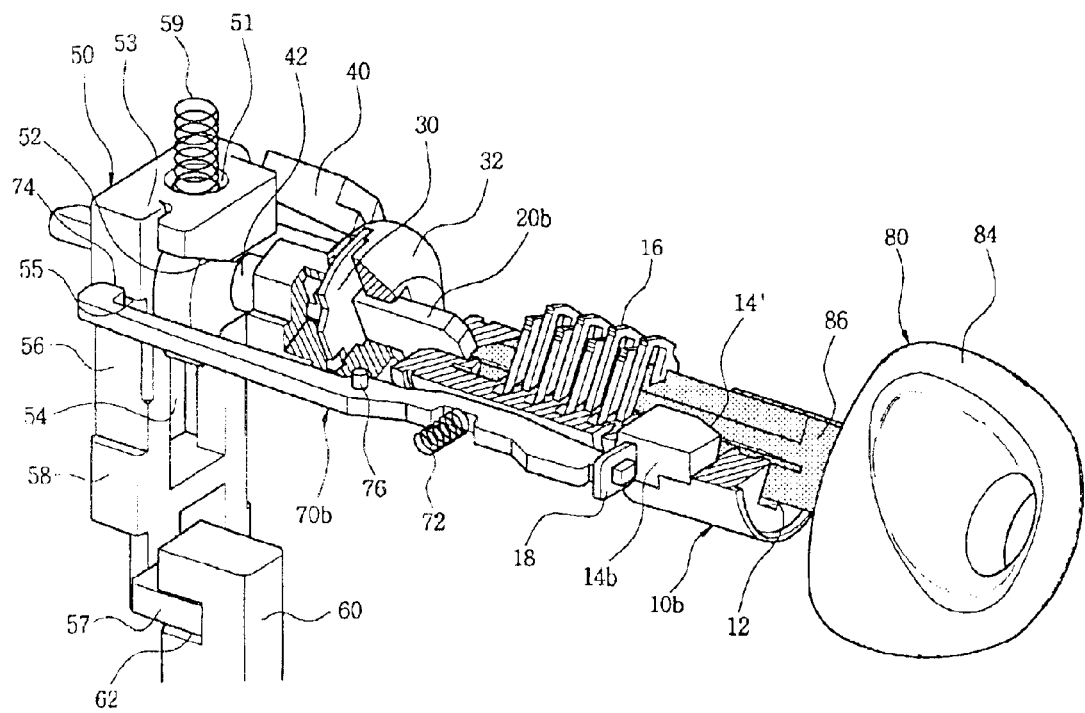
FIG. 8 is a perspective view of a lock assembly for a vehicle according to the prior art, in which the lock assembly is shown in a partial section.
Figure 9:
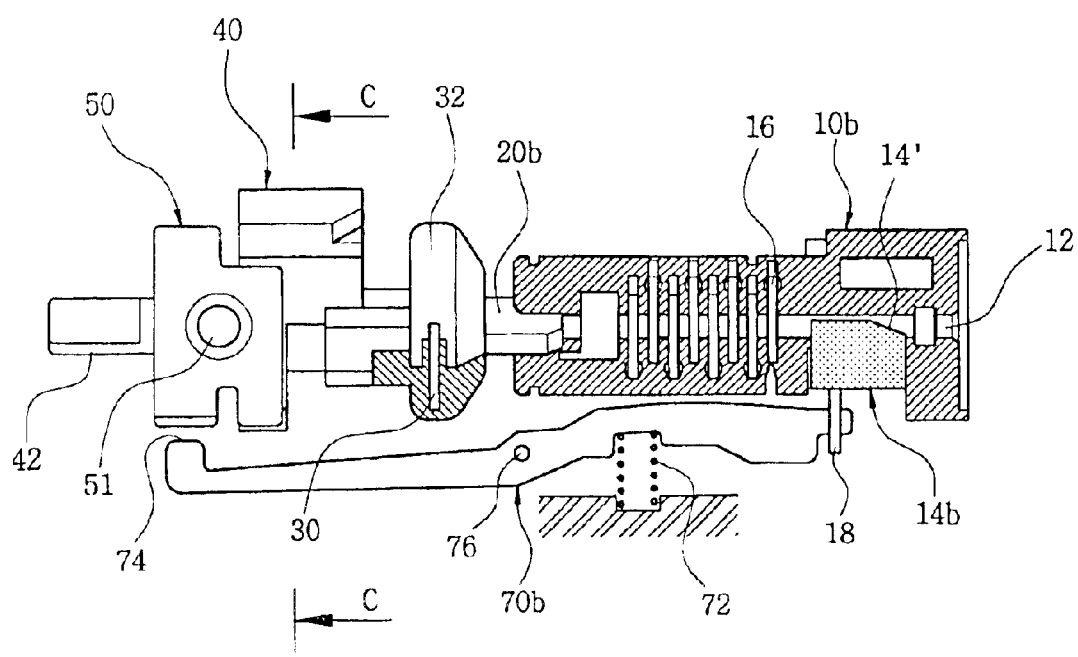
FIG. 9 is a longitudinally sectional view of the lock assembly for the vehicle according to the prior art, in which an ignition key is not inserted in the lock assembly.
Figure 10:
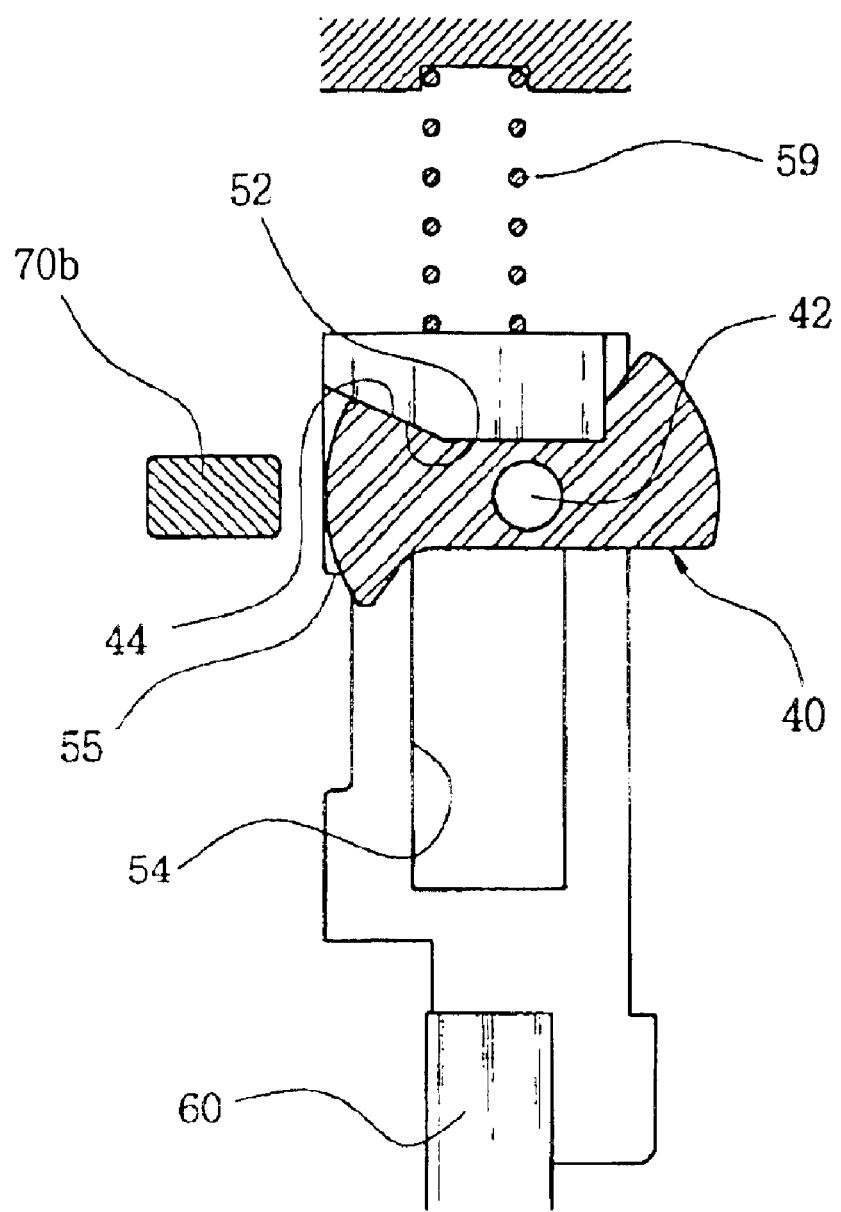
FIG. 10 is a cross-sectional view of the lock assembly for the vehicle according to the prior art, taken along a line C—C in FIG. 9.

FIG. 8 is a perspective view of a lock assembly for a vehicle, in which the lock assembly is shown in partial section. FIG. 9 is a longitudinal sectional view of the lock assembly for the vehicle, in which an ignition key is not inserted in the lock assembly. FIG. 10 is a cross-sectional view of the lock assembly for the vehicle, taken along a line C—C in FIG. 9.

Referring to the structure of the lock assembly, the lock assembly includes: a cylindrical shaped rotor 10*b* which has a desired length and in which a key recess 12 is formed and in which an ignition key is inserted; a push rod 20*b* engaged with a rear end of the rotor 10*b*; a stopper plate 30 mounted on a peripheral surface of the push rod 20*b*; a cam shaft 40 engaged with the rear end of the push rod 20*b*; a lock stopper 50 which has a spring receiving recess 51 formed at an upper surface thereof, a slot hole 54 formed at the center portion thereof, and a locking step 57 formed at a lower end thereof; a lock bar 60 engaged with the locking step 57 of the lock stopper 50; and a locking lever 70*b* which has a desired length and of which an intermediate portion is fixed by means of a hinge to a lock body (not shown), a rear end positioned to be in a surface contact with a side of the lock stopper 50, and a front end combined with a slide piece 14*b* of the rotor 10*b*, as described hereinafter.

The rotor 10*b* has a cylindrical shape, in which the key recess 12 is formed along a whole length of the rotor 10. A plurality of lock plates 16 are mounted to be engaged with cut portions 82 of the ignition key 80 in the rotor 10*b*, which has the slide piece 14*b* mounted on a side thereof to block the key recess 12 before the ignition key is inserted into the key recess 12. Especially, the slide piece 14*b* has an inclined surface 14' directed to the key recess 12.

Figure 12A:
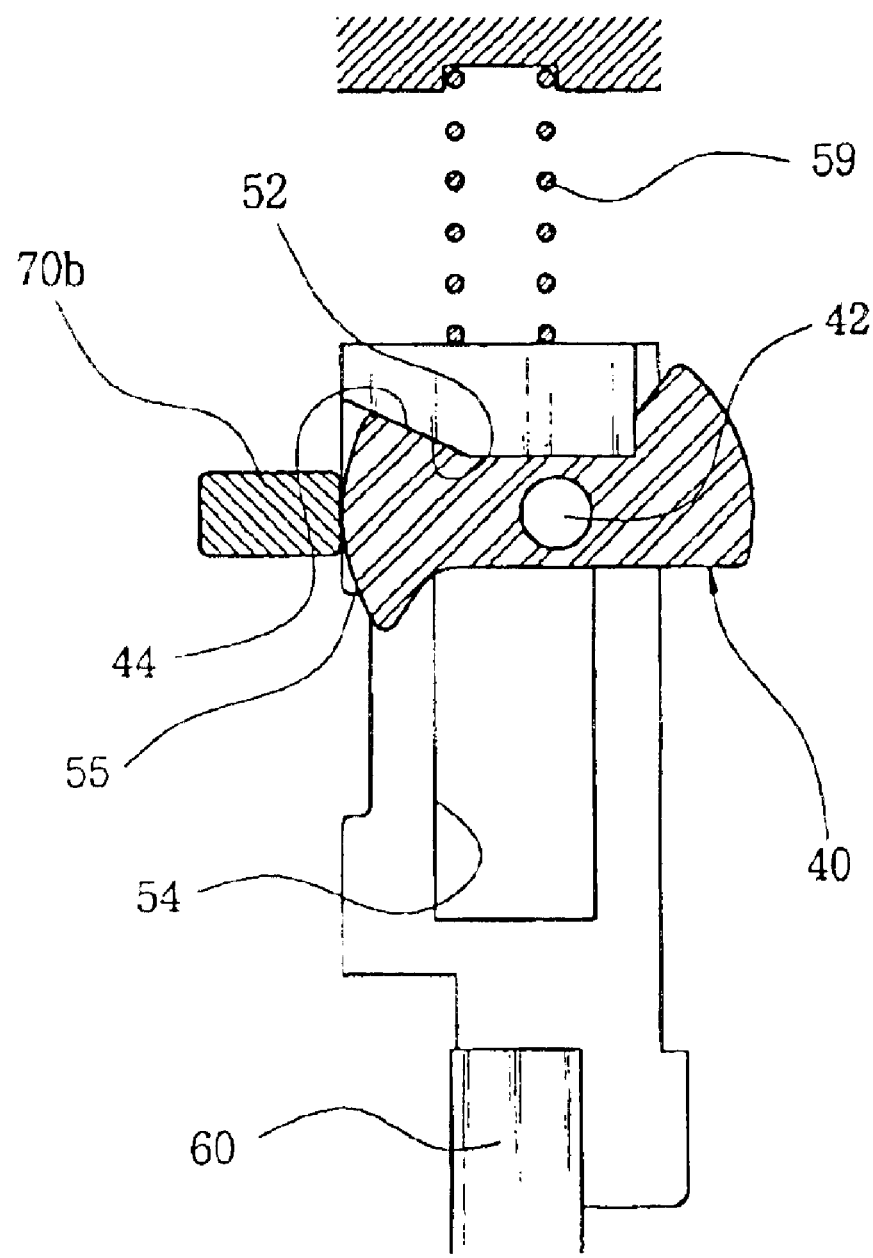
FIG. 12A is a cross-sectional view of the lock assembly for the vehicle according to the prior art, taken along a line D—D in FIG. 11.
Figure 12B:
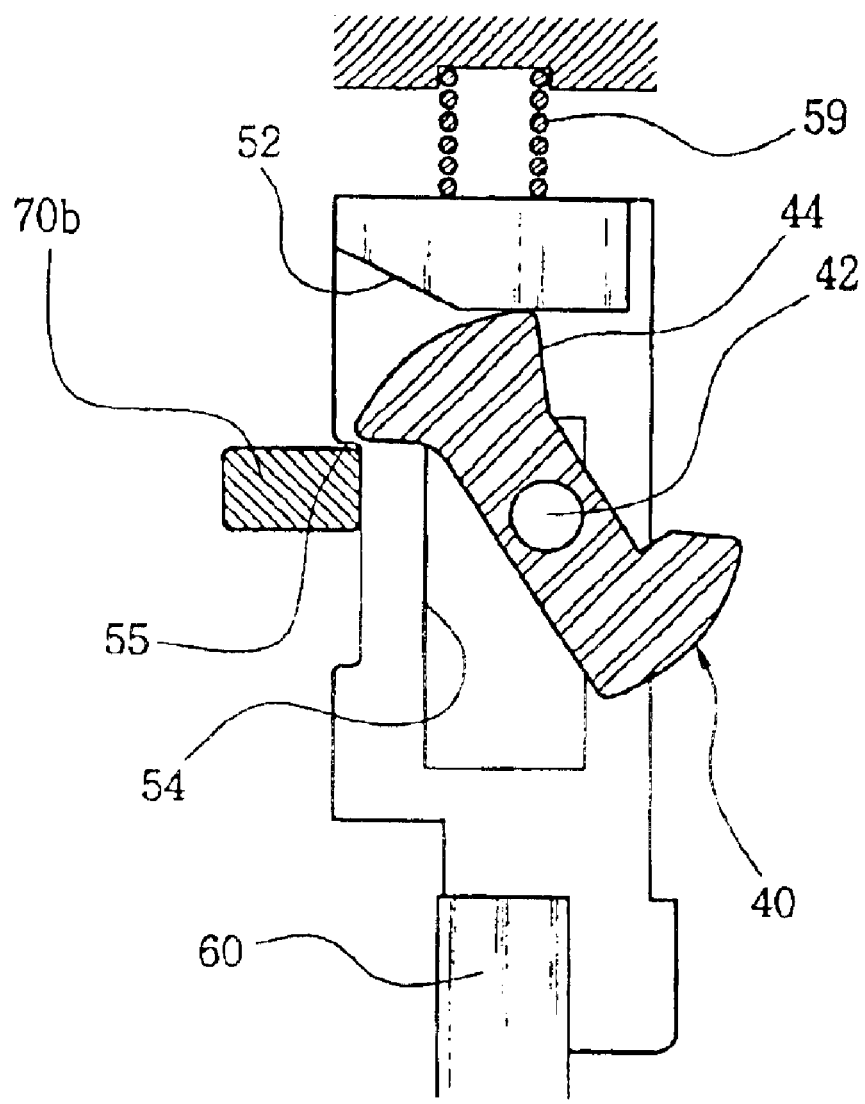
FIG. 12B is a cross-sectional view of the lock assembly for the vehicle according to the prior art, taken along the line D—D in FIG. 11, in which a camshaft is in an unlocked state.

The push rod 20*b* has a surface (not shown) which is inclined inwardly at a bottom portion, of which the front end is engaged with the rear end of the rotor 10*b* to be moved backward by means of a terminal end of the ignition key 80 and of which the rear end is engaged with the cam shaft 40 to transfer a rotation force applied to the key 80 by a user to the cam shaft 40. The stopper plate 30 enclosed with a case 32 is inserted and disposed in the peripheral surface of the push rod 20*b*. The cam shaft 40 engaged with the rear end of the push rod 20*b* has a shape such as wings of a butterfly as shown in FIGS. 10, 12A and 12B, of which both sides are convex, of which both ends respectively have surfaces inclined at a different angle, and of which a rotation shaft 42 extends through the intermediate portion.

The lock stopper 50 has a long structure, of which the spring receiving recess 51 is formed at the center portion of an upper surface. Furthermore, the lock stopper 50 has an upper body 53 having an inclined surface 52 at a portion of the bottom surface thereof, a center body having the slot hole 54 at the center portion and a latching groove 55 at a side thereof, and a lower body 58 having a locking step 57 vertically formed. The slot hole 54 has a long length and the latching groove 55 has a wide width.

When the ignition key is not rotated before/after insertion, the bottom surface of the upper body 53 of the lock stopper 50 comes into surface contact with the upper surface of the cam shaft 40. The inclined surface 52 at the bottom portion of the upper body 53 of the lock stopper 50 comes into surface contact with a first inclined surface 44 at an upper side of the cam shaft 40. Further, the compressible spring 59 is received in the spring receiving recess 51 concavely formed on the upper surface of the upper body 53 of the lock stopper 50. Of course, an upper portion of the spring 59 is supported by means of the lock body (not shown), and a rotation shaft 42 of the cam shaft 40 extends through the slot hole 54 formed in the center body of the lock stopper 50.

At this time, the locking step 57 integrated with the lower body 58 of the lock stopper 50 is engaged with the lock bar 60 in such a manner that the locking step 57 is inserted into a locking recess 62 formed on the upper portion of the lock bar 60. Although not shown, a lower end of the lock bar 60 is detachably combined with a steering shaft for supporting a steering wheel.

Meanwhile, the locking lever 70*b* has a rear end vertically bent, of which a center portion is fixed by means of a hinge 76 to the lock body (not shown) and of which one end of the compressible spring 72 is fixed to an outer surface thereof. At this time, the other end of the spring 72 is fixed to the lock body. Thus, the locking lever 70*b* has the front end combined with the slide piece 14*b* which is mounted on the rotor 10*b*, and of which the vertically bent surface 74 of the rear end is spaced apart a predetermined distance from the side of the lock stopper 50.

When the ignition key 80 has not been inserted into the key recess 12, the front end of the locking lever 70*b* forces the slide piece 14*b* to the key recess 12 by means of the resilient force of the spring 59, so that the slide piece 14*b* blocks the key recess 12 of the rotor 10*b*, as shown in FIG. 9. The vertically bent surface 74 of the rear end of the locking lever 70*b* is spaced at a desired distance apart from the side of the lock stopper 50 as described above.

Furthermore, before the ignition key 80 is inserted in the key recess 12 of the rotor 10b, the bottom portion of the upper body 53 of the lock stopper 50 comes in a surface contact with the upper surface of the cam shaft 40 as shown in FIG. 10. The inclined surface 52 at the bottom portion of the upper body 53 of the lock stopper 50 comes into surface contact with the first inclined surface 44 of the upper portion of the cam shaft 40.

Figure 11:
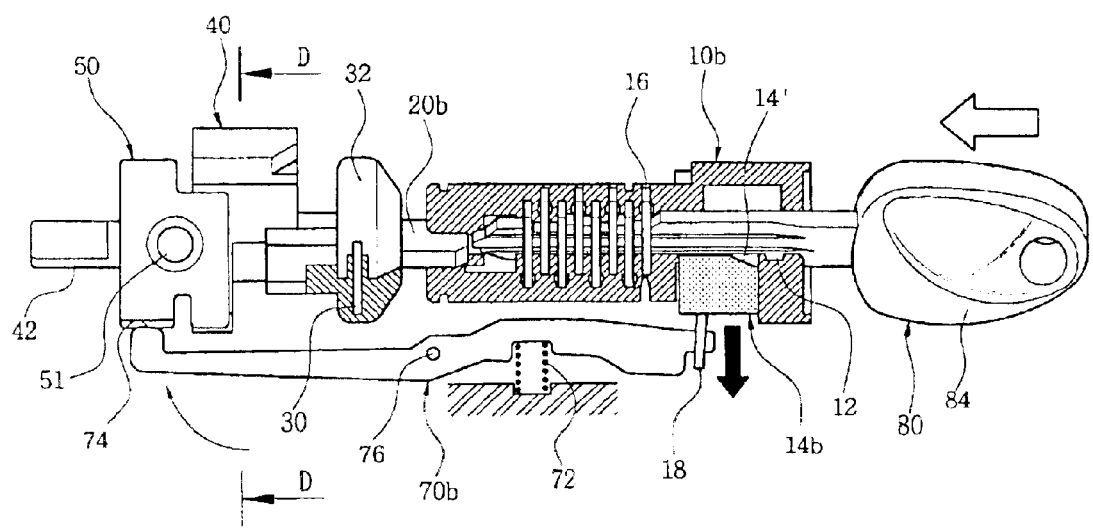
FIG. 11 is a longitudinal sectional view of the lock assembly for the vehicle according to the prior art, in which the ignition key is inserted in the lock assembly.

When the ignition key 80 is inserted into the key recess 12 of the rotor 10b, the ignition key makes contact with the inclined surface 14' of the slide piece 14b to push the slide piece 14b downwardly as shown in FIG. 11. While the slide piece 14b is pushed downwardly, the front end of the locking lever 70b, which is combined by means of a pin 18 with the slide piece 14b, rotates clockwise around the hinge 76. At the same time, the spring 72 of the locking lever 70b is pressed and the rear end of the locking lever 70b also rotates clockwise around the hinge 76 so that the vertically bent surface 74 comes in a surface contact with the side of the upper body 53 of the lock stopper 50, as shown in FIGS. 11 and 12A.

When the ignition key 80 has been inserted in the key recess 12, the cut portion 82 of the ignition key 80 is engaged with the lock plate 16 of the rotor 10b, which in turn can be rotated to start an engine of the vehicle. That is, when the ignition key 80 is rotated, the rotor 10b, the push rod 20b, and the cam shaft 40 can be rotated together.

Figure 13:
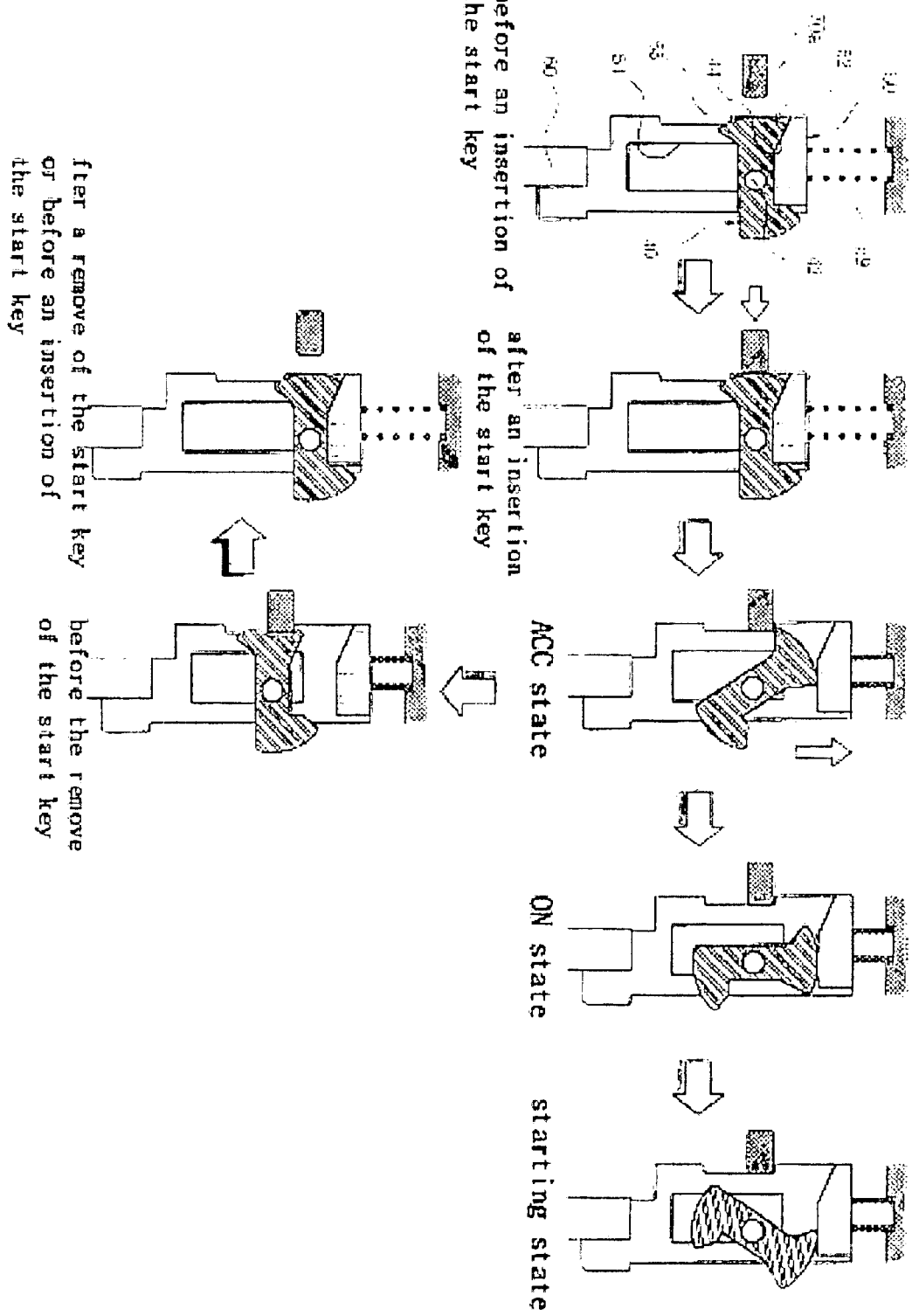
FIG. 13 is a sectional view of the lock assembly for the vehicle according to the prior art which shows operation states of the camshaft as the start is inserted and rotated in the lock assembly.

Referring to FIG. 13, at step A, before the ignition key is inserted in the key recess, the bottom portion of the upper body 53 of the lock stopper 50 comes into surface contact with the upper surface of the cam shaft 40, and especially the inclined surface 52 at the bottom portion of the upper body 53 of the lock stopper 50 comes into surface contact with the first inclined surface 44 of the upper portion of the cam shaft 40.

At step B, the ignition key 80 has been inserted in the key recess 12. The cam shaft 40 is held in the same state as the step A, and the vertically bent surface 74 at the rear end of the locking lever 70b comes into close contact with the one side of the upper body 53 of the lock stopper 50, as described above.

At step C, after the ignition key 80 is inserted in the key recess 12 and is rotated to supply electric power to components in the vehicle, the cam shaft 40 is rotated at a desired angle. At that time, the first inclined surface 44 of the upper portion of the can shaft slides along the inclined surface 52 of the upper body 53 of the lock stopper 50 to push the upper body 53 of the lock stopper 50 upward, moving the lock stopper 50 upward. More particularly, as the lock stopper 50 is moved upwardly, the spring 59 placed in the spring receiving recess 51 on the upper body 53 of the lock stopper 50 is compressed. Especially, the lock bar 60 engaged with the locking step 57 of the lower body 58 of the lock stopper 50 is pulled upward. As the lock bar 60 is pulled upward, the lower end of the lock bar 60 is removed from the steering shaft (not shown) so as to handle the steering wheel. As the lock stopper 50 moves upward, the vertically bent surface 74 slides backward to an initial position to be placed in the latching groove 55 formed on a side of the center body 56 of the lock stopper 50.

At step D, the ignition key is rotated to start on the engine of the vehicle. The cam shaft 40 is rotated at the angle of 90 degrees to the initial position.

At step E, the ignition key is further rotated. The cam shaft 40 is now at an angle of 180 degrees compared to its position at step C.

At step F, the ignition key is rotated as in step A, but is not removed from the key recess 12 of the rotor 10b. The cam shaft 40 is in a horizontal state like in the initial position, but does not come in the close contact with the lower surface of the upper body 53 of the lock stopper 50.

That is, since the ignition key 80 is not removed from the key recess 12 of the lock assembly, the vertically bent surface 74 of the rear end of the locking lever 70b is maintained in the latching groove 55 of the center body 56 of the lock stopper 50 in the closely contacted state. Accordingly, the lock stopper 50 also is not moved to the initial position so that the close contact between the upper surface of the cam shaft 40 and the bottom surface of the upper body 53 of the lock stopper 50 is released.

When the ignition key 80 is removed from the key recess 12 of the lock assembly, the front end of the locking lever 70b is rotated around the hinge 76 to the slide piece 14b by means of a resilient restoring force of the pressed spring 72, while the slide piece 14b is pushed by the front end of the locking lever 70b to move to the initial position in order to block up the key recess 12 of the rotor 10b. At this time, the vertically bent surface 74 of the rear end of the locking lever 70b is rotated counterclockwise around the hinge 76 to be spaced at a desired distance apart from the upper body 53 of the lock stopper 50.

As the vertically bent surface 74 of the rear end of the locking lever 70b is released from the latching groove 55 of the lock stopper 50, the lock stopper 50 is subjected to the resilient restoring force of the pressed spring 59 to be moved downward. When the lock stopper 50 is moved downward, the lock bar 60 engaged with the locking step 57 of the lower body 58 of the lock stopper 50 is also is moved downward so that the lower end portion of the lock bar 60 locks the steering shaft, thereby preventing the steering wheel from rotating.

In the above described lock assembly, since the stopper plate, the push rod and the cam shaft are positioned out of the steering shaft, when the crush pad and instrument panel, which include a cover enclosing the steering shaft and the lock assembly, are modulated, the lock assembly including the locking lever generally cannot be used for different types of vehicles.

Figure 1:
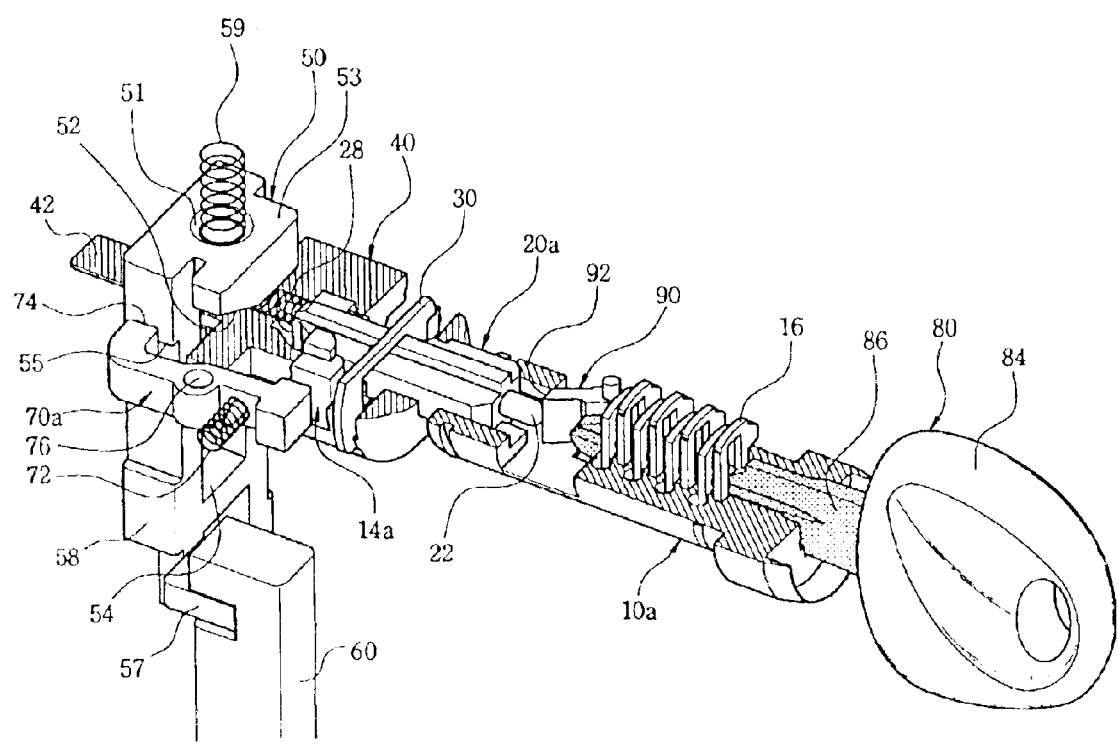
FIG. 1 is a perspective view of a lock assembly having a short key recess for reducing a length of an ignition key for a vehicle according to the present invention, in which the lock assembly is shown in a partially sectional view.
Figure 2:
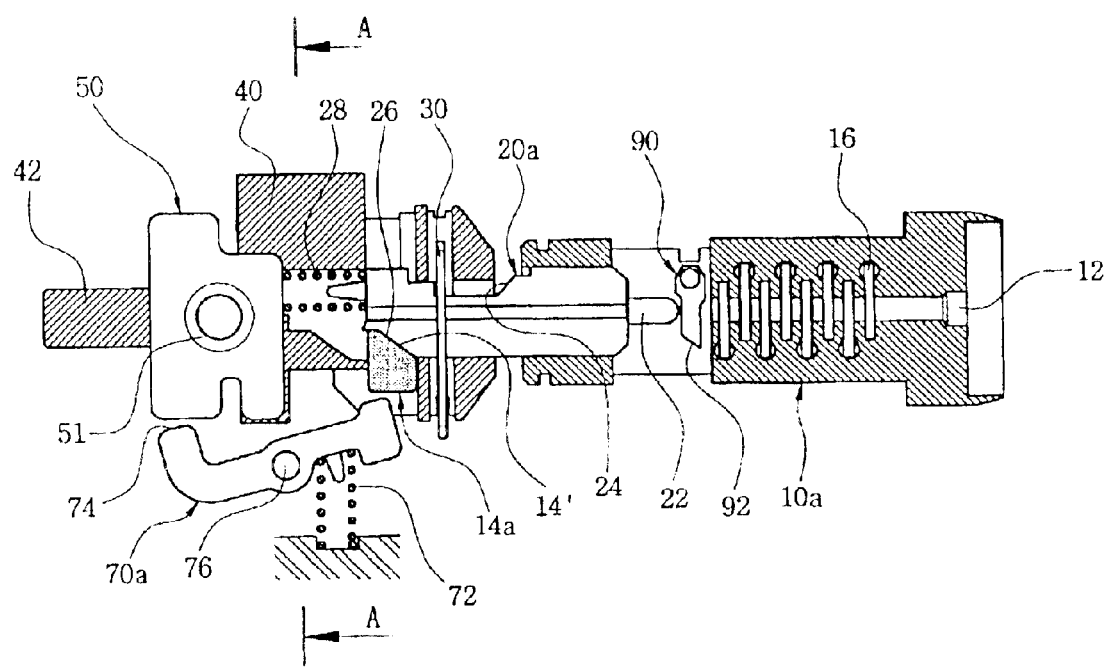
FIG. 2 is a longitudinally sectional view of the lock assembly having the short key recess for reducing a length of the ignition key for the vehicle according to the present invention, which shows the lock assembly before the ignition key is inserted in the key recess of the lock assembly.
Figure 3:
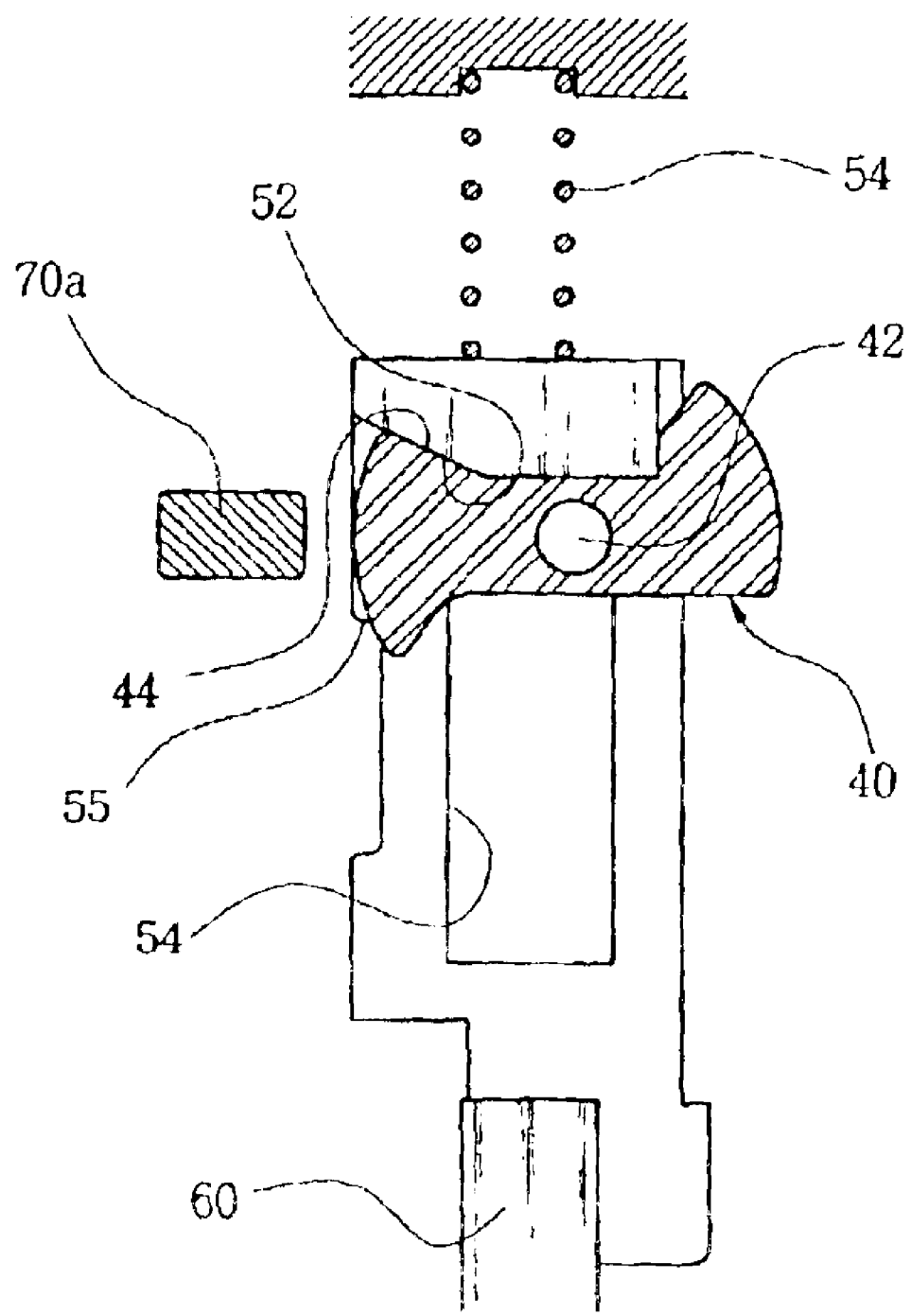
FIG. 3 is a cross-sectional view of the lock assembly according to the present invention, taken along a line A—A in FIG. 2.

FIG. 1 is a perspective view of a lock assembly having a short key recess that requires a reduced length ignition key for a vehicle, according to the present invention. The lock assembly is shown in a partially sectional view. FIG. 2 is a longitudinal sectional view of the lock assembly shown in FIG. 1, which shows the lock assembly before the ignition key is inserted into the key recess of the lock assembly. FIG. 3 is a cross-sectional view of the lock assembly according to the present invention, as taken along a line A—A in FIG. 2. An important feature of the present invention is that the lock assembly is configured to be disposed in the steering shaft, and that an ignition key used in conjunction with the lock assembly has a shorter length than conventional ignition keys.

The lock assembly according to the present invention includes a rotor 10a having a key recess 12 formed therein, which has a desired length. The lock assembly also includes a pusher 90 mounted in the rotor 10a to be rotated around an axis of a hinge shaft. The lock assembly further includes a push rod 20a engaged with a rear end of the rotor 10a, of which a side of an intermediate portion and a side of a rear end, respectively, have slide surfaces which are inclined. A stopper plate 30 is mounted on a peripheral surface of the push rod 20a. A cam shaft 40 is engaged with a rear end of the push rod 20a. A locking stopper 50 is configured to move upward and downward as the cam shaft 40 is rotated. The locking stopper 50 has a spring receiving recess 51 formed on an upper surface thereof, a slot hole 54 formed at the center portion thereof, and a locking step 57 formed at a lower end thereof. A lock bar 60 is engaged with the locking step 57 of the locking stopper 50. A locking lever 70a having a short length has an intermediate portion fixed by means of a hinge to a lock body (not shown), a rear end positioned to be in a surface contact with a side of the lock stopper 50, and a front end combined with a slide piece 14 of the rotor 10a, as described hereinafter.

The pusher 90 is mounted in the rotor 10a to rotate around a hinge, of which an upper end is rotatably fixed to the rotor 10a by means of the hinge and of which a lower end has an inclined surface 92 to come into surface contact with a knob 22 of the push rod 20a when the pusher 90 rotates around the hinge as described below. In a preferred embodiment of the invention, the pusher 90 is installed in a space formed at an intermediate portion (i.e. after the lock plate 16) of the rotor 10a, thereby reducing the length of the ignition key 80. Therefore, the ignition key 80 can be inserted into the lock assembly, contacting the pusher 90 mounted at the intermediate portion in the rotor 10a, so that an ignition key having a much shorter length than that of a conventional ignition key may be used.

The front end of the push rod 20a is inserted in the rear end of the rotor 10a. The knob 22 is integrally combined with the front end of the push rod 20a, which is configured to be pushed by the pusher 90. Furthermore, the push rod 20a has inclined surfaces 24 and 26 formed at a side of the intermediate and a side of the rear end of the push rod 20a. The stopper plate 30 encloses the peripheral surface of the push rod 20a whose rear end is inserted into the cam shaft 40. The compressed spring 28 is placed between the cam shaft 40 and the rear end of the push rod 20a. The slide piece 14a is disposed on a sliding surface 26 of the rear end of the push rod 20a, of which the inclined surface comes into surface contact with the sliding surface 26. The locking lever 70a having a short length, of which the front end makes a surface contact with a peripheral surface of the slide piece 14a, is provided.

The intermediate portion of the locking lever 70a is fixed by means of the hinge 76 to the lock body of the lock assembly, while a spring 72 is attached to an intermediate surface of the locking lever 70a so as to be supported by the lock body. Furthermore, the rear end of the locking lever 70a has a vertical bent surface 74 which is spaced at a predetermined distance from a side of the upper body 53 of the lock stopper 50.

Figure 4:
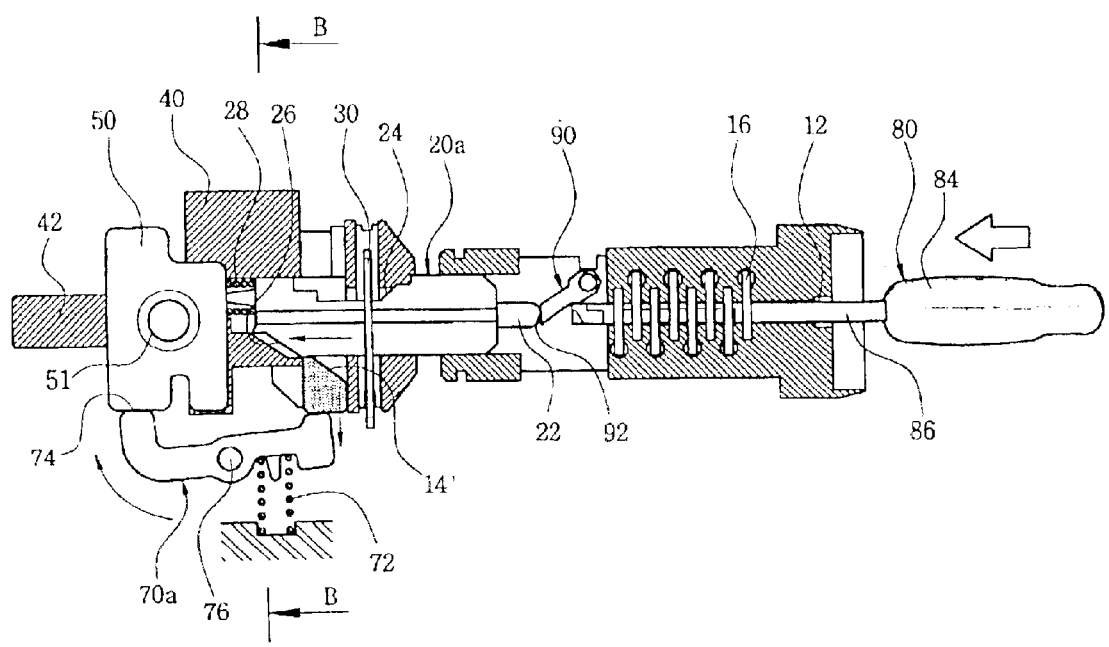
FIG. 4 is a longitudinally sectional view of the lock assembly having the short key recess for reducing a length of the ignition key for the vehicle according to the present invention, which shows the lock assembly after the ignition key is inserted in the key recess of the lock assembly.
Figure 5A:
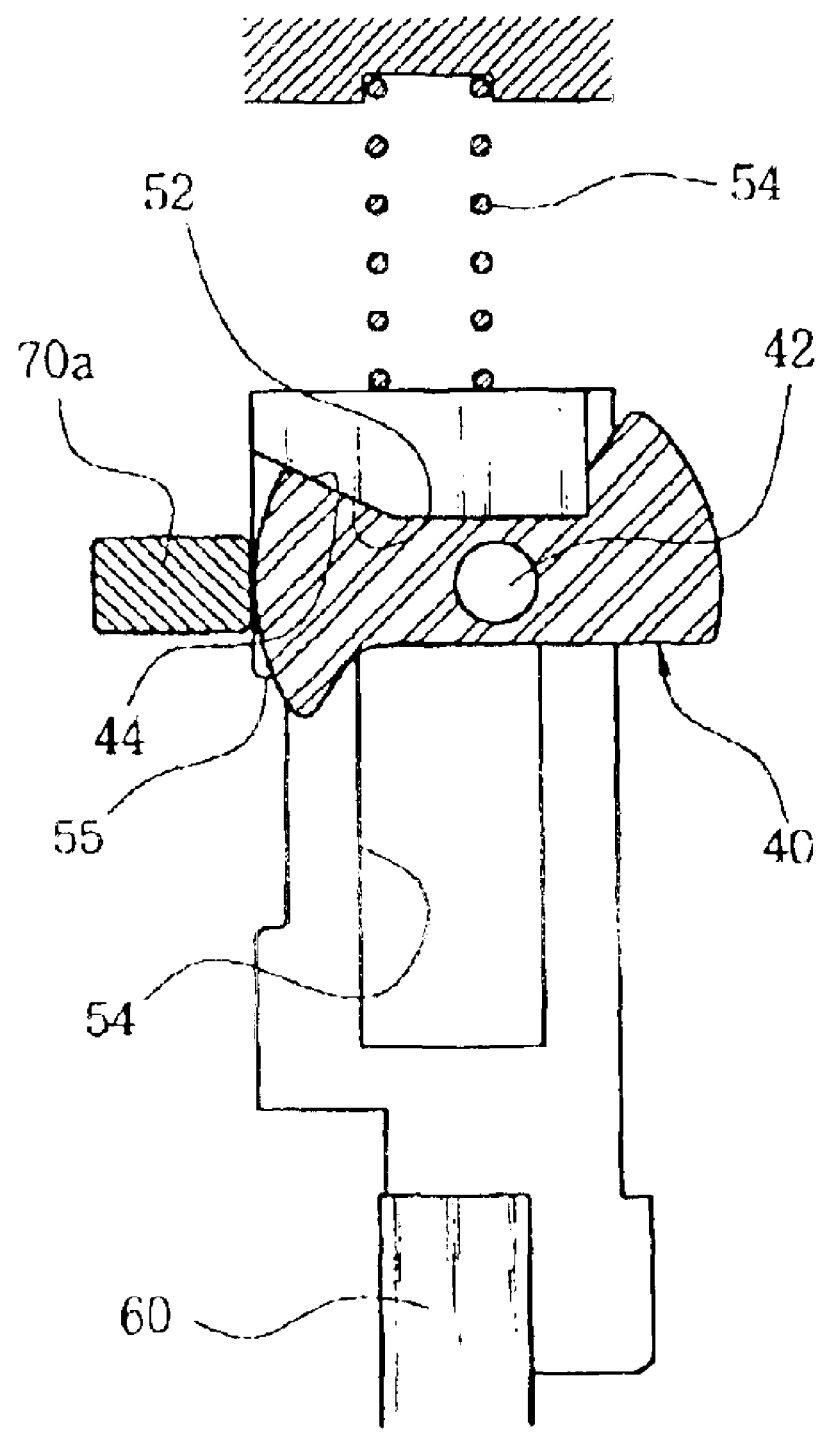
FIG. 5A is a cross-sectional view of the lock assembly according to the present invention, taken along a line B—B in FIG. 4.
Figure 5B:
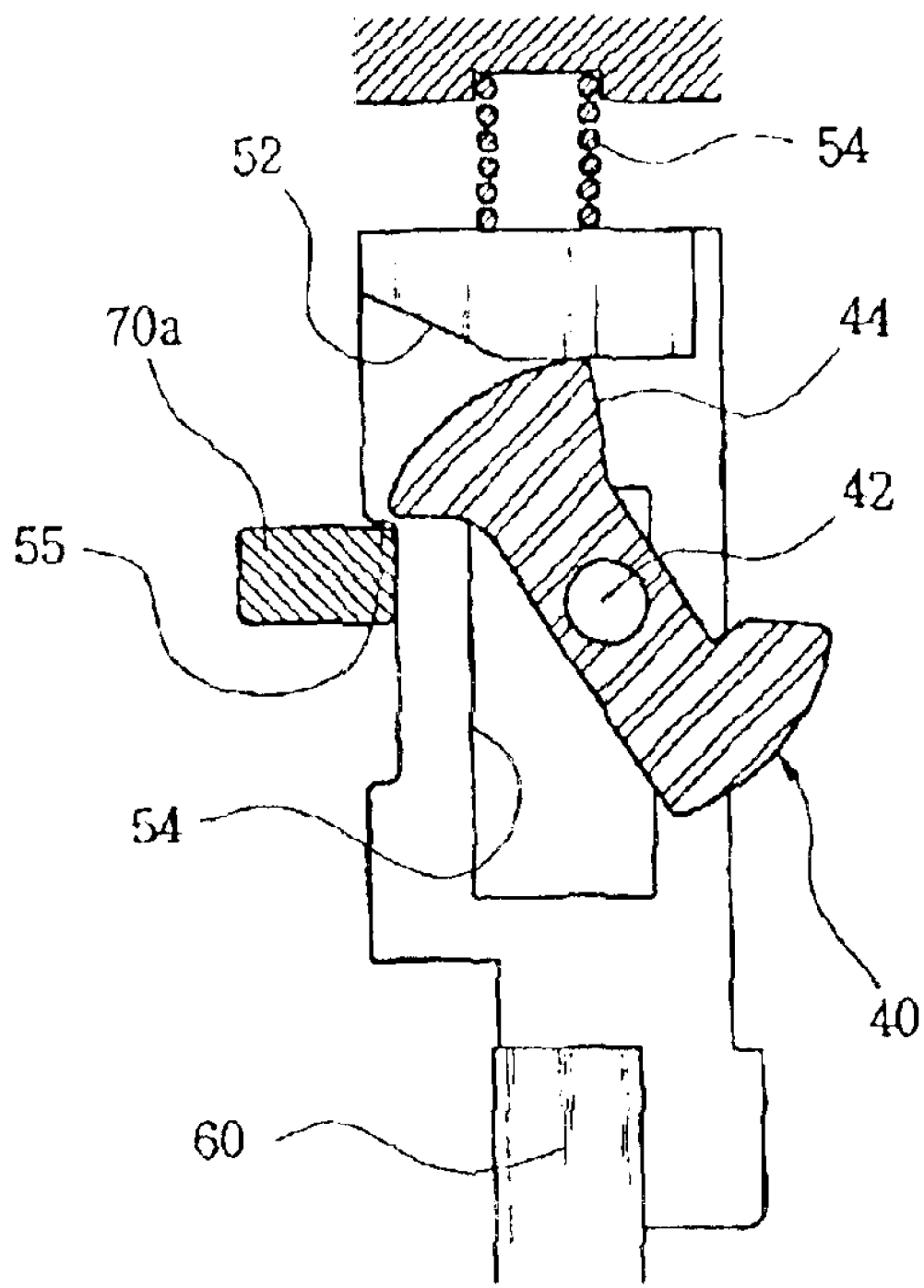
FIG. 5B is a cross-sectional view of the lock assembly according to the present invention, taken along a line B—B in FIG. 4, in which a camshaft of the lock assembly is in an unlocked state.

FIG. 4 is a longitudinal sectional view of the lock assembly having the short key recess for receiving an ignition key, according to the present invention. This figure shows the lock assembly after the ignition key has been inserted into the key recess of the lock assembly. FIG. 5A is a cross-sectional view of the lock assembly according to the present invention, taken along a line B—B in FIG. 4. FIG. 5B is a cross-sectional view of the lock assembly according to the present invention, taken along a line B—B in FIG. 4, in which a camshaft of the lock assembly is in an unlocked state.

When the ignition key 80 having a shorter length than conventional keys is inserted into the key recess 12 of the rotor 10a, the rear end of the ignition key 80 pushes the pusher 90 attached to the intermediate portion of the rotor 10a while the pusher 90 rotates around the hinge shaft to push the knob 22 of the push rod 20a. The knob 22 comes in the surface contact with the inclined surface 92 of the bottom portion of the pusher 90. When the push rod 20a is pushed inwardly, the rear end of the push rod 20a is inserted into the cam shaft 40 compressing the spring 28. At this time, the slide surface 26 of the rear end of the push rod 20a pushes the slide piece 14a outward. That is, in the state that the slide surface 14a of the push rod 20a comes into surface contact with the inclined surface of the slide piece 14a, the push rod 20a is pushed backward to push the slide piece 14a outward.

The slide piece 14a pushes the front end of the locking lever 70a, so that the front end of the locking lever 70a rotates around the hinge 76. At this time, the spring 72 of the locking lever 70a is compressed. As the rear end of the locking lever 70a rotates around the hinge 76, the vertically bent surface 74 of the rear end of the locking lever 70a comes into surface contact with the upper body 53 of the lock stopper 50 as shown in FIGS. 5A to 5B, so that the ignition key 80 is in the state to be rotated at an ignition step. That is, when the ignition key 80 is rotated, the rotor 10a, the push rod 20a and the cam shaft 40 engage with one another and rotate together. The rotation states of the cam shaft 40 according to the position of the ignition key are the same as the above-described steps A, B, C, D, E and F.

Figure 6:
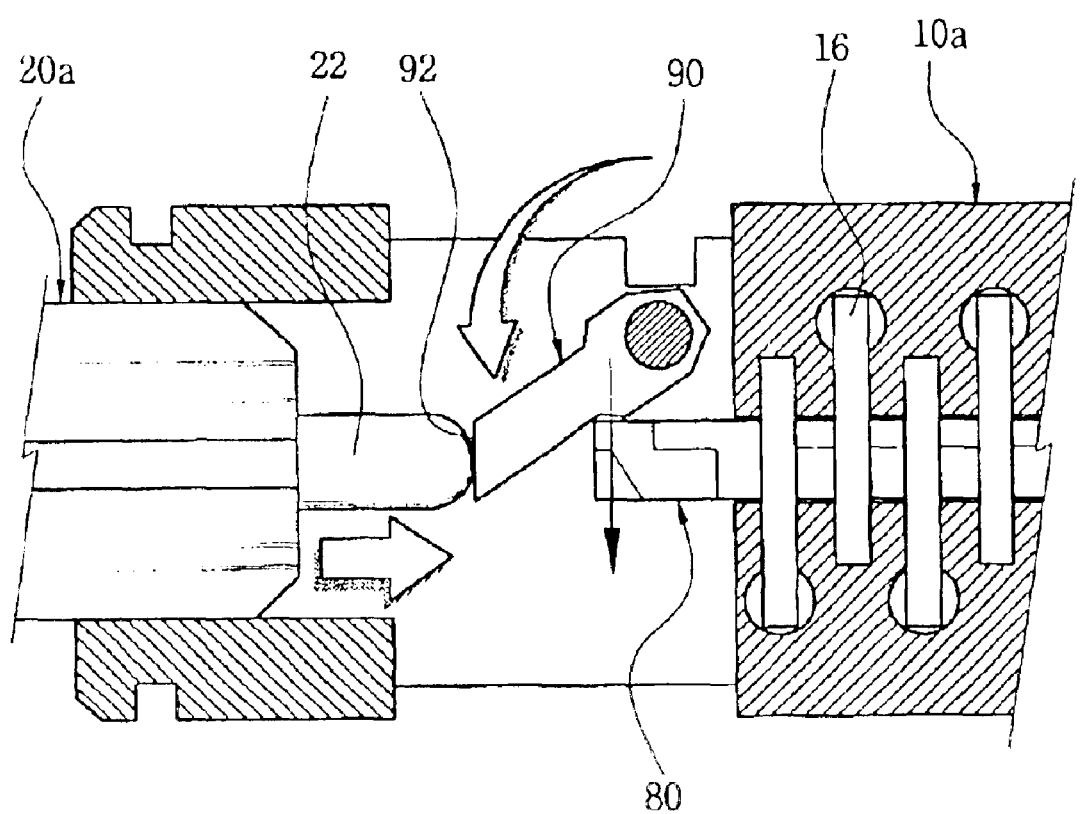
FIG. 6 is a partially enlarged sectional view of the lock assembly according to the present invention, which illustrates a principle in that the ignition key is not pushed after inserted into the lock assembly.

Similarly, when the ignition key 80 is removed from the key recess 12 of the rotor 10a, the pusher 90 is rotated backward around the hinge to the initial position. The spring 28 compressed between the cam shaft 40 and the push rod 20a is restored to push the push rod 20a in the initial position. The ignition key 80 can hardly be pushed after the ignition key 80 is inserted in the key recess 12 of the rotor 10a, as will be described in detail with reference to FIG. 6. When the pressed spring 28 is restored, the push rod 20a is subjected to a straight force and the knob 22 of the push rod 20a transfers the straight force to the inclined surface 92 of the pusher 90. At this time, the pusher 90 has a momentum of downwardly rotating around the hinge.

When the straight force of the push rod 20a is forced to the ignition key 80, the ignition key 80 is pushed to the initial position. However, since the pusher 90 pushes the upper surface of the ignition key 80, the ignition key 80 can not be pushed to the initial position. Here, when the ignition key is rotated from a standby step to an off step, the operation of further inserting the ignition key in the lock assembly in the two steps will be described.

Figure 7A:
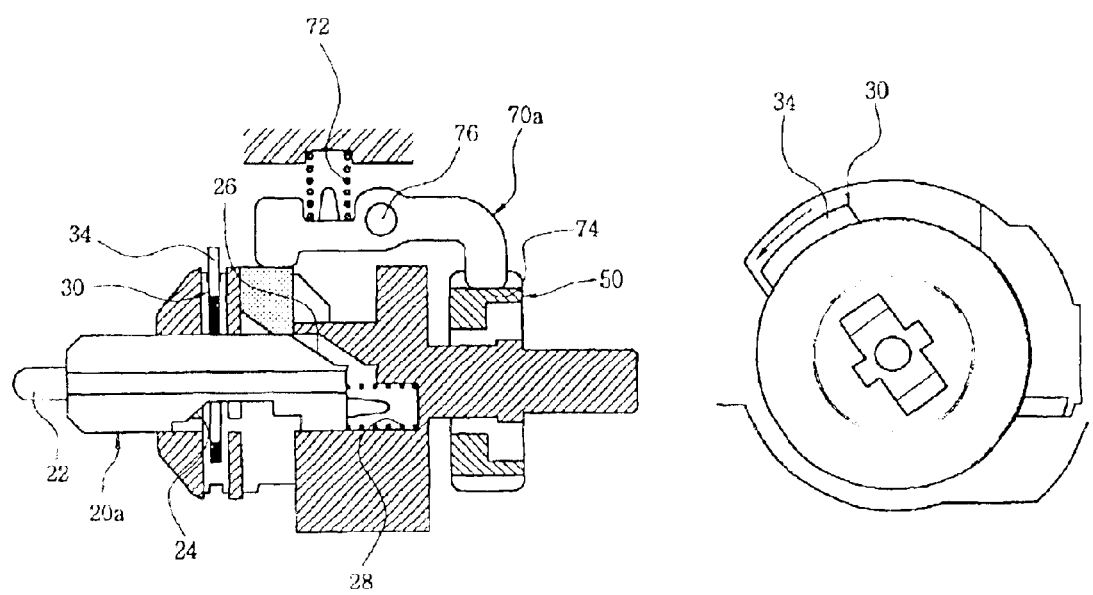
FIGS. 7A and 7B are partially enlarged sectional view of the lock assembly according to the present invention, which the lock assembly is locked before the ignition key is released from the lock assembly.
Figure 7B:
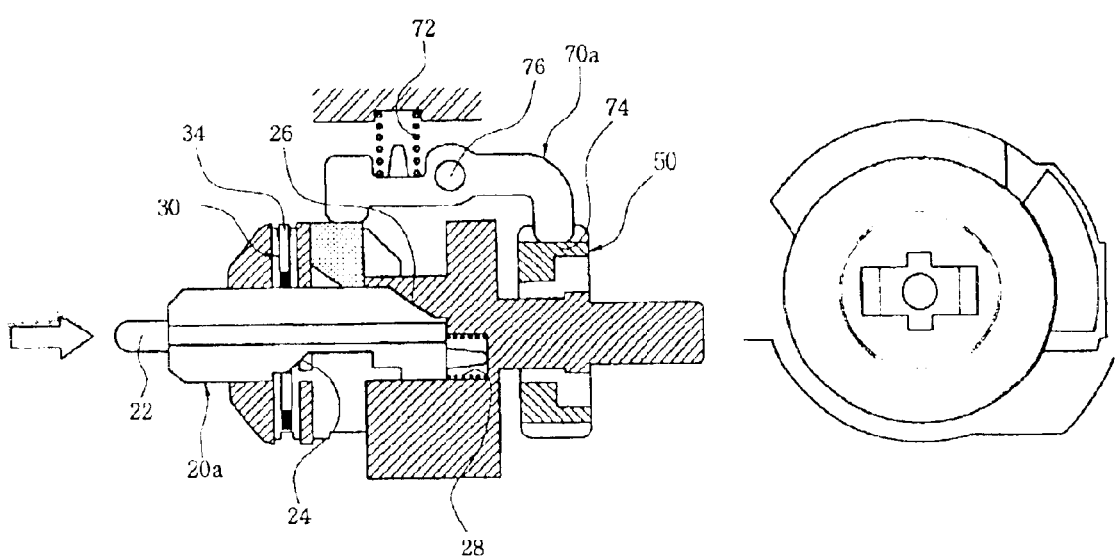

When the ignition key 80 is rotated from the standby step to the off step, the ignition key 80 can be hardly rotated. This causes the driver to confirm the position of the ignition key so as to guarantee the safe driving of the vehicle. That is, a projection 34, which is formed at a side of the peripheral surface of the stopper plate 30 mounted on the peripheral surface of the push rod 20a, is latched by means of the lock body when the ignition key 80 is rotated at the off step, as shown in FIG. 7a. Thereby, the ignition key can be hardly rotated.

Thus, when the ignition key 80 is further inserted into the lock assembly, the push rod 20a is also pushed by means of the pusher 90 so as to move inward. The slide surface 24 of the intermediate portion of the push rod 20a pushes the inner surface of the stopper plate 30. At the same time, the stopper plate 30 slides along the slide surface 24, of which the projection is inwardly moved. That is, the projection 34 of the stopper plate 30 moves inward to be hidden. Accordingly, the projection hardly is latched anymore by means of the lock body, so that the ignition key can be easily rotated.

As described above, the mechanism including the pusher is applied to the lock assembly in order to use the ignition key having much a shorter length than current keys. The important elements of the lock assembly, for example the locking lever, the push rod, and the cam shaft, which are positioned out of the steering shaft in the conventional art, are now disposed in the steering shaft. Thereby, the design of the module of the crush pad can be easily accomplished.

The present invention has a number of advantages. For example, the lock assembly has a short key recess, thereby reducing the need for a long ignition key for the vehicle. In other words, the structure and the operation mechanism of the lock assembly have been improved to allow a shorter ignition key to be used, which is more convenient to a user. The modulation of a crush pad can be easily established as all elements of the lock assembly can be disposed in a steering shaft while applying the lock assembly to a different type of vehicles.

While the preferred embodiments of the present invention have been described, it is understood that the present invention should not be limited to these preferred embodiments but various changes and modifications can be made by one skilled in the art within the spirit and scope of the present invention aimed.

What is claimed is:

1. A lock assembly having a short key recess for a reduced length vehicle ignition key, comprising:
    a rotor having a key recess and a gusher mounted toward a rear end of the rotor to be forwardly and backwardly rotated about an axis of a hinge shaft;
    a push rod having a knob formed on a front end surface of the rush rod, wherein said knob is configured and dimensioned to be engaged with said rusher of said rear end of said rotor, wherein said push rod further includes an inclined slide surface on an intermediate portion thereof and an inclined slide surface on a rear end thereof;
    a stopper plate mounted on a peripheral surface of the push rod;
    a cam shaft engaged with a rear end of the push rod;
    a locking stopper moving upwardly and downwardly as the cam shaft is rotated;
    a lock bar engaged with a lower end of the locking stopper;
    a slide piece which is placed so that an inner surface is in surface contact with the inclined slide surface of the rear end of the push rod;
    a locking lever having a short length, which is fixed by a hinge at an intermediate portion thereof to a lock body of the lock assembly; and
    a spring mounted on an outer surface of a front end of the locking lever to be supported by the lock body, wherein an inner surface of the front end of the locking lever comes into surface contact with the slide piece, and wherein a vertically bent surface of the rear end of the locking lever is positioned at a desired distance from a side surface of an upper body of the locking stopper.

2. The lock assembly of claim 1, wherein the pusher is formed with an inclined surface such that an upper end thereof is combined with an inner surface of the rotor by means of a hinge and a lower end thereof comes into surface contact with the knob of the push rod when the hinge is rotated.

3. The lock assembly of claim 1 or 2, wherein the pusher is mounted on an intermediate portion of an inner portion of the rotor in order to be pushed by means of a short ignition key.

4. The lock assembly of claim 1, wherein the rotor has a space at an intermediate portion of the inner portion thereof, in which the pusher is mounted to be forwardly and reversely rotated.

5. The lock assembly of claim 1, further comprising a pressed spring which is disposed between the rear end of the push rod and the cam shaft in which the rear end of the push rod is inserted.

6. A lock assembly, comprising:
    a lock body;
    a rotor having a short length key recess;
    a push rod having an inclined slide surface near a rear end thereof;
    a pusher mounted between the rotor and the push rod and configured to be rotated forward and backward about an axis;
    a slide piece configured to engage said inclined slide surface of said push rod;
    a locking lever rotatably coupled to the lock body by a hinge near an intermediate portion thereof, where a front end of the locking lever is configured to contact the slide piece; and
    a spring coupled between said front end of the locking lever and the lock body to bias the front end of the locking lever against the slide piece.

7. The lock assembly of claim 6, further comprising a cam shaft configured to engage with the rear end of the push rod.

8. The lock assembly of claim 7, further comprising a locking stopper configured to move upward and downward as the cam shaft is rotated, wherein a rear end of the locking lever is positioned at a desired distance from a side surface of an upper body of the locking stopper.

9. The lock assembly of claim 8, further comprising a lock bar engaged with a lower end of the locking stopper.

10. The lock assembly of claim 6, further comprising a knob integrally formed with a front end of said push rod, where said knob is configured to engage said pusher.

11. The lock assembly of claim 10, wherein the pusher is formed with an inclined surface such that an upper end thereof is combined with an inner surface of the rotor by means of a hinge and a lower end thereof comes into surface contact with the knob of the push rod when the hinge is rotated.

12. The lock assembly of claim 6, wherein the pusher is mounted on an intermediate portion of an inner portion of the rotor in order to be pushed by means of an ignition key.

13. The lock assembly of claim 6, wherein the rotor has a space at an intermediate portion of the inner portion thereof, in which the pusher is mounted to be forwardly and reversely rotated.

14. The lock assembly of claim 7, further comprising a pressed spring which is disposed between the rear end of the push rod and the cam shaft in which the rear end of the push rod is inserted.

* * * * *